(12) United States Patent
Hantz

(10) Patent No.: US 9,809,284 B2
(45) Date of Patent: Nov. 7, 2017

(54) STRINGERLESS SURFBOARD WITH CHANNELS

(71) Applicant: Dane Ashley Hantz, San Marcos, CA (US)

(72) Inventor: Dane Ashley Hantz, San Marcos, CA (US)

( * ) Notice: Subject to any disclaimer, the term of this patent is extended or adjusted under 35 U.S.C. 154(b) by 304 days.

(21) Appl. No.: 14/333,318

(22) Filed: Jul. 16, 2014

(65) Prior Publication Data

US 2015/0024644 A1 Jan. 22, 2015

Related U.S. Application Data

(60) Provisional application No. 61/846,735, filed on Jul. 16, 2013.

(51) Int. Cl.
| | |
|---|---|
| *B63B 35/79* | (2006.01) |
| *B32B 5/24* | (2006.01) |
| *B32B 3/30* | (2006.01) |
| *B29C 63/00* | (2006.01) |
| *B29L 31/52* | (2006.01) |

(52) U.S. Cl.
CPC ............ *B63B 35/7906* (2013.01); *B32B 3/30* (2013.01); *B32B 5/245* (2013.01); *B29C 63/0073* (2013.01); *B29L 2031/5272* (2013.01); *B32B 2262/0269* (2013.01); *B32B 2262/101* (2013.01); *B32B 2262/106* (2013.01); *B32B 2266/0228* (2013.01); *B32B 2266/0278* (2013.01); *B32B 2307/54* (2013.01); *B32B 2307/546* (2013.01); *B32B 2307/718* (2013.01); *Y10T 156/10* (2015.01)

(58) Field of Classification Search
CPC ......................... B63B 35/7906; B63B 35/7909
USPC ..................................... D21/769, 770; 441/74
See application file for complete search history.

(56) References Cited

U.S. PATENT DOCUMENTS

| | | | |
|---|---|---|---|
| 5,385,494 A * | 1/1995 | Wilhelmi | ............ B63B 35/7936 114/39.14 |
| 6,767,264 B2 * | 7/2004 | Mercer | ................. B63B 35/812 441/65 |

(Continued)

OTHER PUBLICATIONS http:/twww.swaylocks.com/forums/stringerless-strength, Thread posted Dec. 6, 2009-Dec. 13, 2009, Archive date Jul. 20, 2011, retrieve date May 16, 2016.*

(Continued)

*Primary Examiner* — Andrew Polay
(74) *Attorney, Agent, or Firm* — Joseph G. Chu; JCIP

(57) ABSTRACT

A lightweight surfboard that is rigid yet provides uniform flex characteristic without the use of a traditional wooden stringer includes a stringerless blank foam and a set of channels shaped into a top portion of the body of the surfboard. The set of channels comprises a pair of adjacent, axially extending elongated concave grooves that run along the length of the set of channels, meet at their end points and form a convex center section. The convex center section of the set of channels provides the support to prevent the board from breaking due to the bending of the surfboard while being ridden on the wave. A laminating layer may be glassed on the set of channels for additional strength. The laminating layer may include fiberglass cloth, Kevlar, carbon fiber or any suitable material.

19 Claims, 12 Drawing Sheets

(56) References Cited

U.S. PATENT DOCUMENTS

D627,026 S * 11/2010 Durocher ............ B63B 35/7936
                                                    D21/769
7,845,999 B2 * 12/2010 Conner, Jr. ............... B32B 3/12
                                                     441/74
D684,232 S * 6/2013 Vercelli ............... B63B 35/7936
                                                    D21/769

OTHER PUBLICATIONS http://www.swaylocks.com/groups/stringerless-0, Thread posted Mar. 24, 2005-Mar. 25, 2005, retrieve date May 17, 2016.*
Stretch Boards, Web Pages, Printed Jul. 16, 2014, http://www.stretchboards.com/boards/surfboards/buzzsaw.php[Jul. 16, 2014 12:57:47 PM].

* cited by examiner

STRINGERLESS SURFBOARD WITH CHANNELS

CROSS-REFERENCE TO RELATED APPLICATIONS

This patent application claims priority to and incorporates by reference herein the U.S. Provisional Patent Application Ser. No. 61/846,735 filed on Jul. 16, 2013 entitled "Parabolic Channel Surfboard for Normalizing Flex."

BACKGROUND OF THE INVENTION

1. Field of the Invention

The present invention generally relates to a lightweight, stringerless surfboard with channels that provide superior flexibility characteristic and rigidity while the surfboard is moving on a wave.

2. Description of Prior Art and Related Information

The material bending of a surfboard in the water, also commonly termed "flex," is one of the most important aspects of a modern surfboard. Flex allows the foam material of the surfboard to bend without breaking, store potential energy, return the surfboard to its original shape, release the stored potential energy and turn it into kinetic energy. The principle of flex can be understood by understanding how a surfboard behaves as it is being ridden on a wave. As a surfer rides down the face of a wave in high speed and performs a steep bottom turn maneuver at the bottom of the wave, the surfboard foam begins to bend into the turn and store potential energy. As the surfer comes out of the bottom turn and straightens the direction of the board toward the uppermost part of the breaking wave, also known as the "lip," the surfboard springs back to its original shape, releases the potential energy to become kinetic energy and propels the surfer out of the turn. This burst of kinetic energy can be turned into an acceleration to help the surfer gain speed for the next maneuver. However, the balance between flexibility and rigidity of the surfboard must be maintained to prevent the surfboard from snapping during bending.

Surfboards are typically constructed of polyurethane foam, polystyrene foam, expanded polystyrene foam, or extruded polystyrene foam, which are subsequently laminated by fiberglass cloth, Kevlar or carbon fiber for additional strength. However, the foam and the laminating materials by themselves are relatively weak to withstand bending. Therefore, to maintain the structural integrity of the surfboard due to bending, a strip of wood known as a "stringer" is typically embedded in the middle of the surfboard foam extending from the tail to the nose. The stringer effectively provides a spine to the foam that increases the strength and rigidity of the surfboard. Commonly used wood for stringers are balsa wood, basswood, redwood, cedar and birch.

While the addition of the stringer to the foam increases the strength and rigidity of the surfboard, there are a number of problems associated with the stringer. First, a conventional stringer that is placed in the middle of the surfboard, or a "center stringer," often results in a surfboard that is rigid along the center of the surfboard, but weak and flexible along the surfboard's curved perimeter edges, commonly known as the "rails." This inconsistent rigidity throughout the surfboard is known as a torsion flex, which causes the board to be non-uniform in its flex, inconsistent in its plane, lose its drive and slow down while traveling on a wave.

To address the issue of torsion flex, a known technique in the art places the stringers on and along the rails of the surfboard instead of in the middle of the surfboard. This type of stringers is known as "parabolic stringers." The theory behind the parabolic stringers is that by strengthening the rails, the foam can bend and spring back to its original shape quicker while the structural integrity of the foam is maintained and somewhat more uniform. However, employing parabolic stringers significantly increases the cost of labor in surfboard construction, as the blank foam must first be cut in a parabolic arc, and the wooden stringer must have a certain thickness, carefully hand bent and hand glued along the rails to follow the outline of the surfboard. Additionally, as the center stringer is typically used as a reference point of symmetry, shaping a surfboard with parabolic rails is difficult and time consuming.

An obvious issue related to the use of stringers in surfboard construction is the added material and labor costs, as some types of wood may be expensive and difficult to install into the blank foam. In addition, having the wooden stringer and glue in the foam increases the weight of the surfboard, which may affect the performance of the surfboard and consistency of the flex. Lastly, the wooden stringer reduces the shelf-life of the surfboard's responsiveness. After repeated compression and expansion due to the flex, a surfboard's traditional wooden stringer weakens, giving the surfboard a dead feeling.

Based on the foregoing, there is a need in the surfboard industry for a cost-effective surfboard that is lighter, stronger and more uniform in its flex characteristic without the use of traditional wooden stringers.

BRIEF SUMMARY OF THE INVENTION

A stringerless surfboard with at least one set of channels that embodies the invention described herein solves the problems encountered in the prior art discussed above.

In one aspect, a surfboard comprises a stringerless foam having a nose portion, a tail portion, curved perimeter edges known as "rails," a top portion that is generally planar along a horizontal plane known as a "deck," a bottom portion that is also generally planar along the horizontal plane, and a set of channels provided on the deck. The set of channels comprises a pair of generally axially extending, elongated concave grooves that are adjacent to each other, meet at their end points and form a convex center section. In one preferred embodiment, the convex center section may include a rounded, crescent shaped top. In another preferred embodiment, the convex center section may include a flat top with either sharp edges or slightly rounded edges.

According to a preferred embodiment, two sets of channels are provided on the deck, wherein each set of channels is laterally positioned close to the outline of a rail. In another preferred embodiment, three sets of channels are provided on the deck, wherein one set of channels is positioned along the center of the board and axially extending from the tail to the middle of the board, and two sets of channels are laterally positioned close to the outlines of the rails.

Preferably, the embodiments may further include a laminating layer placed over the set of channels for additional strength. By way of example, and not as a limitation, the laminating layer may include fiberglass cloth, Kevlar, carbon fiber or any suitable materials.

It is to be appreciated that the convex center of the set of channels on the deck provides the rigidity required to prevent the surfboard from breaking due to bending and provides an excellent uniform flex characteristic to overcome torsion flex by eliminating the wooden stringer.

In yet another aspect, a method of providing a stringerless surfboard having a uniform flex characteristic and excellent rigidity is provided. The method may comprise the step of providing a stringerless blank foam; shaping the stringerless blank foam into a surfboard generally comprising a deck portion that is generally planar along a horizontal plane, a bottom portion that is generally planar along the horizontal plane, a tail, a nose, a left rail and a right rail outlining edges of the stringerless surfboard from the tail to the nose; and providing at least a set of channels on the deck of the stringerless surfboard.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Throughout the specification, positional and directional terms below refer to the following:

"Front" shall refer to the nose of a surfboard.

"Back" shall refer to the tail of the surfboard.

"Top" shall refer to the upperside of the surfboard that is generally planar along a horizontal plane where a surfer places his or her feet when the surfboard is being ridden on a wave.

"Bottom" shall refer the underside of the surfboard that is generally planar along the horizontal plane where the fins are located and the surface that is in direct contact with the water surface when the surfboard is being ridden on a wave.

"Right" shall refer to the right side of the surfboard when the surfboard is viewed from the top and the front is pointing up in a vertical direction.

"Left" shall refer to the left side of the surfboard when the surfboard is viewed from the top and the front is pointing up in a vertical direction.

"Axial" shall refer to a direction extending between the front and the back.

Figure 1:
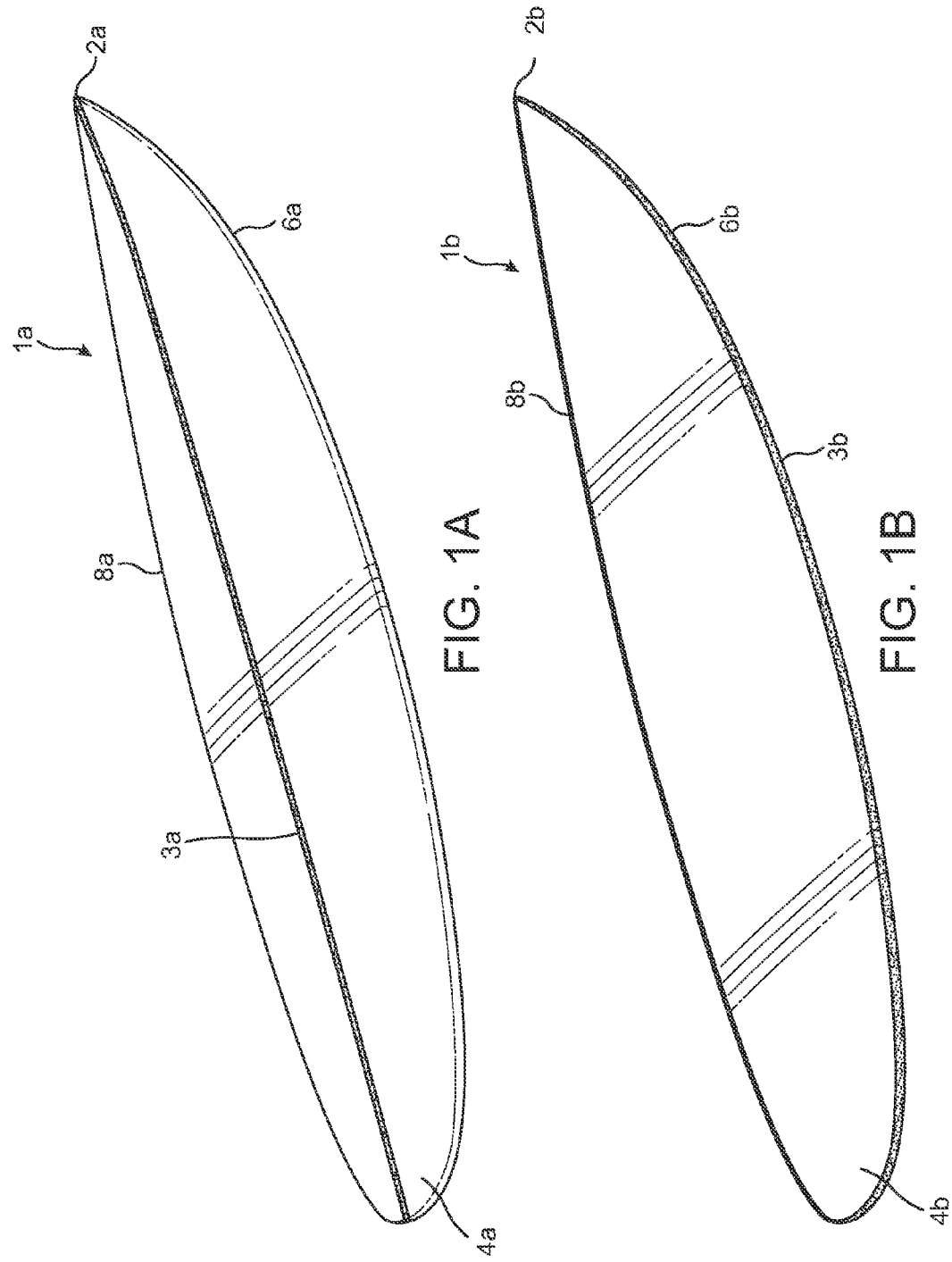
FIG. 1A is a perspective view of a traditional surfboard known in the art.
FIG. 1B is a perspective view of an alternative embodiment of the traditional surfboard known in the art.
Figure 2:
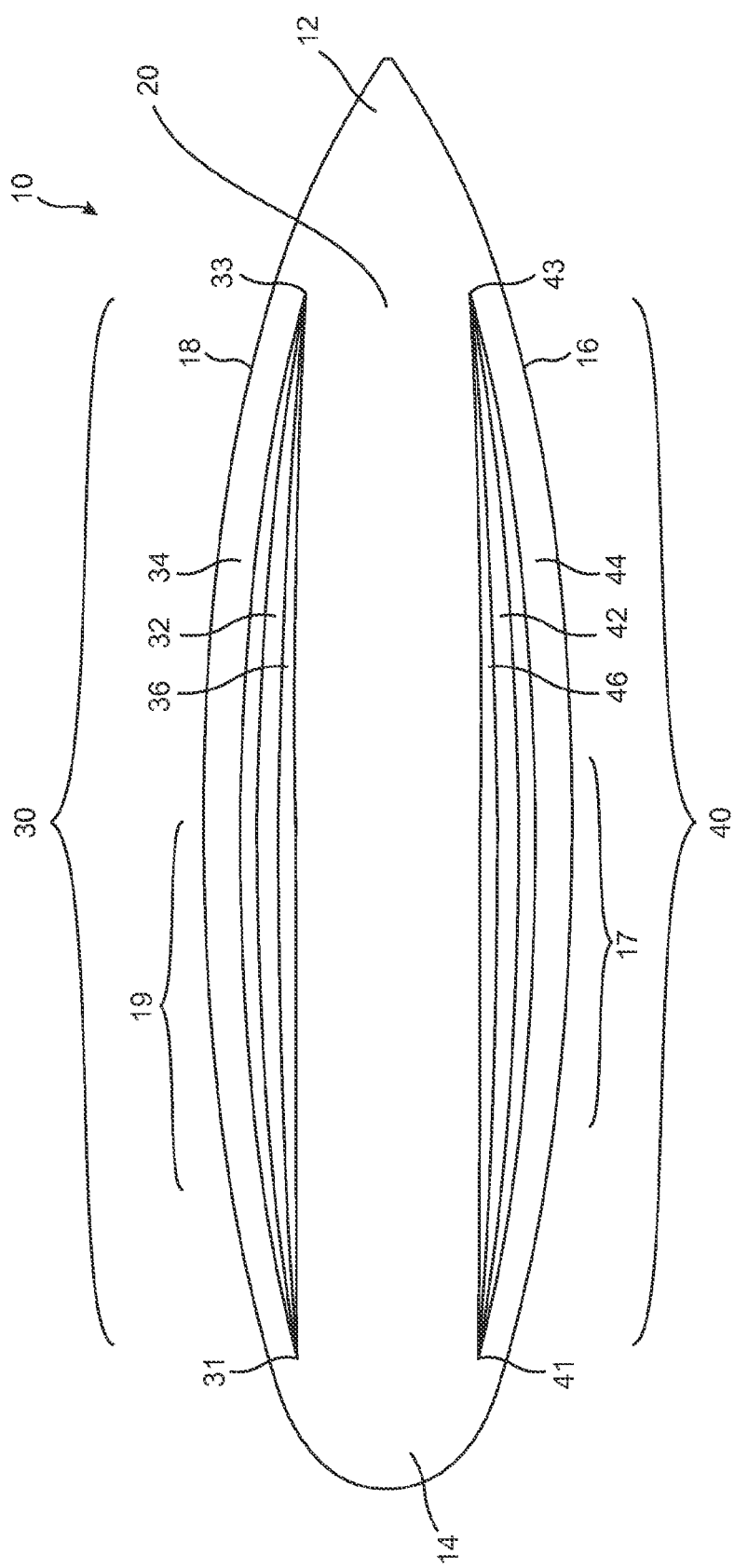
FIG. 2 is a top view of a first preferred embodiment of a stringerless surfboard with channels.
Figure 3:
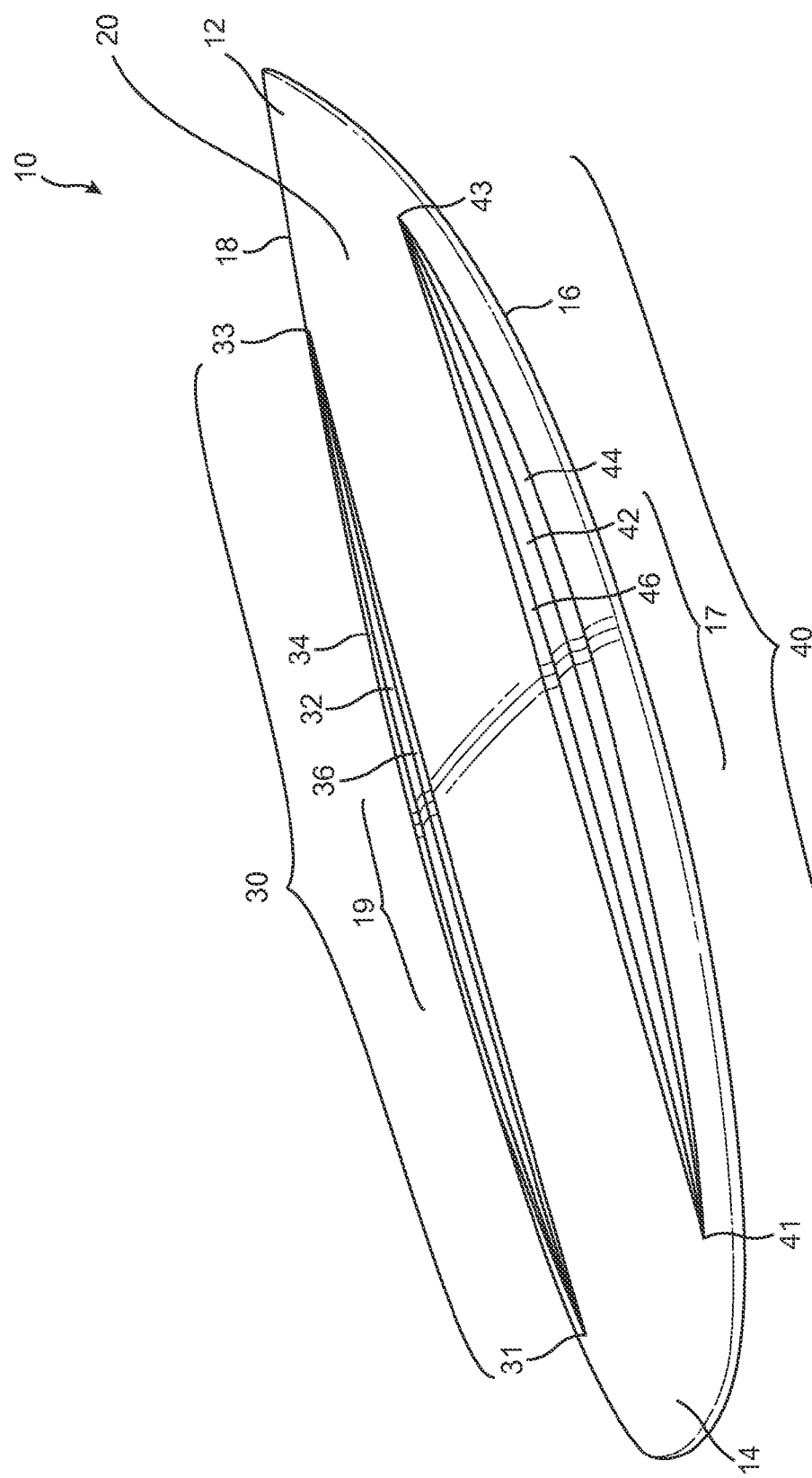
FIG. 3 is a perspective view of the first preferred embodiment of the stringerless surfboard with the channels.
Figure 4:
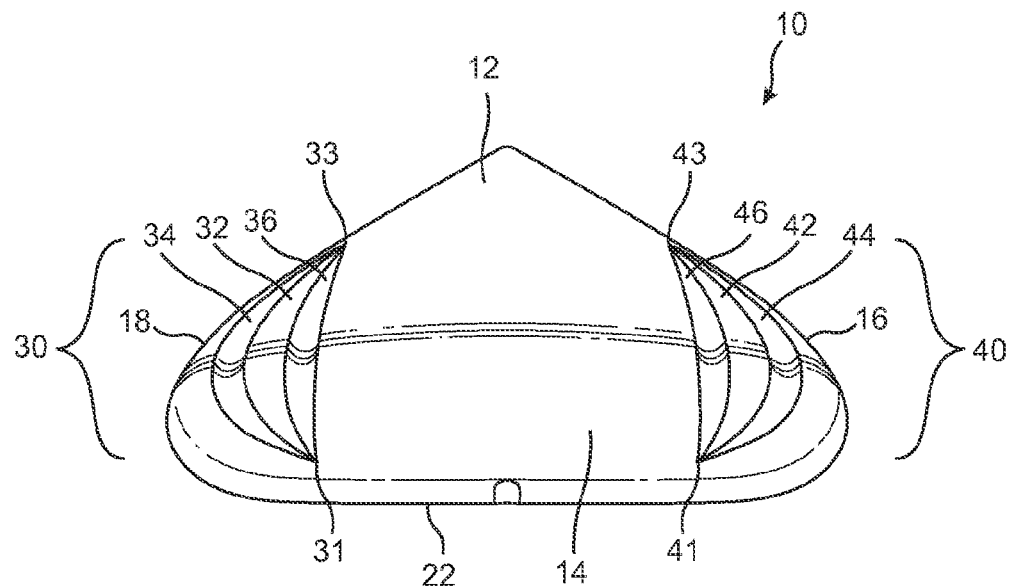
FIG. 4 is a back view of the first preferred embodiment of the stringerless surfboard with the channels.
Figure 5:
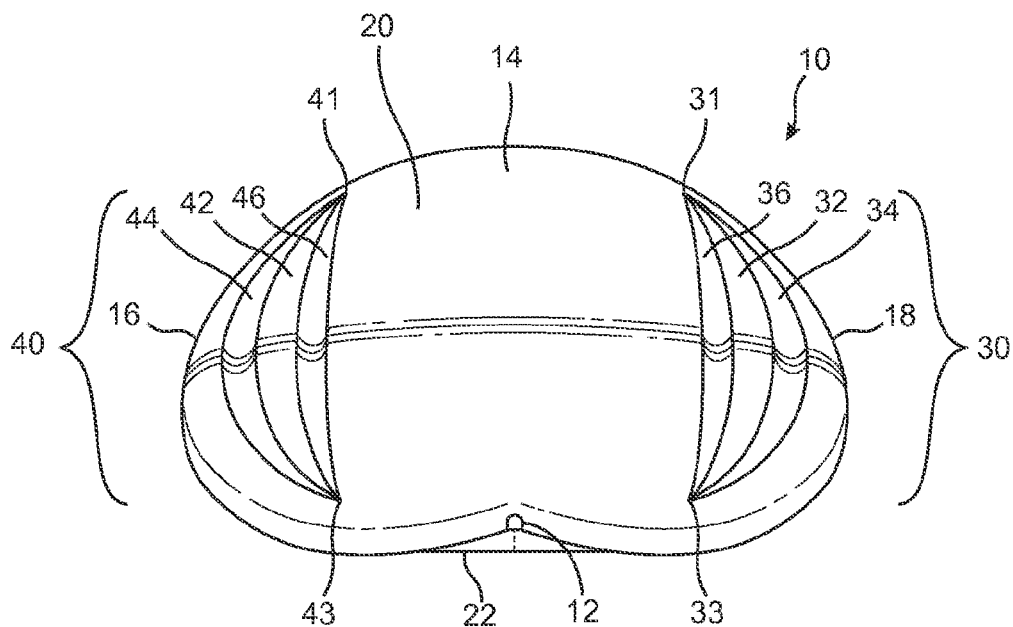
FIG. 5 is a front view of the first preferred embodiment of the stringerless surfboard with the channels.

FIGS. 1A and 1B illustrate a side-by-side view of traditional surfboards known in the art, designated by reference numerals 1a and 1b. As shown, the prior art surfboard 1a includes a nose 2a, a tail 4a, a right rail 6a, a left rail 8a, and a center stringer 3a. The center stringer 3a is a strip of wood embedded in the middle of the surfboard foam extending from the tail 4a to the nose 2a. The center stringer 3a provides a spine to the foam that increases the strength and rigidity of the surfboard. On the other hand, the prior art surfboard 1b includes a nose 2b, a tail 4b, a right rail 6b, a left rail 8b, and a parabolic stringer 3b. Unlike the center stringer 3a, the parabolic stringer 3b is a thicker strip of wood that is placed along the rails 6b and 8b instead of in the middle of the surfboard foam. Commonly used wood for stringers 3a and 3b are balsa wood, basswood, redwood, cedar and birch. Consequently, the addition of either a center stringer 3a or a parabolic stringer 3b to a surfboard increases the weight of the surfboard and affects the uniformity of the board's flex.

Embodiments of the present invention are a sharp departure from these traditional surfboards known in the art, in that no stringer is used at all. In FIGS. 2-5, a first preferred embodiment of a stringerless surfboard, or simply board, 10 comprises at least one set of axially extending channels formed on the deck. In the preferred embodiments shown in FIGS. 2-5, the board 10 preferably comprises two sets of axially extending channels, with each set positioned adjacent to a rail of the board. The board 10 may include a blank foam made of polyurethane foam, polystyrene foam, expanded polystyrene foam, or extruded polystyrene foam, which does not include a wooden stringer. As shown in FIGS. 2-5, the board 10 generally comprises a nose 12, a tail 14, a top portion (also known as a deck) 20, a bottom portion 22, a right rail 16, a left rail 18 and at least a set of channels placed on the deck 20 along the horizontal plane. It shall be appreciated that the board may comprise a single set of channels or a plurality of sets of channels, which may be positioned at any location on the deck 20, including laterally adjacent to the rails or centrally along the middle of the deck 20.

According to a preferred embodiment, the board 10 comprises a pair of identical sets of channels laterally placed on the deck 20, namely, a left set of channels 30 and a right set of channels 40. The identical sets of channels 30 and 40 may be shaped into the deck.

As illustrated in FIGS. 2-5, the left set of channels 30 is axially extending and conforming to a left horizontal curvature 19 of the left rail 18, and the right set of channels 40 is axially extending and conforming to a right horizontal curvature 17 of the right rail 16. The left set of channels 30 further comprises a left outer elongated, concave groove, or simply a left outer groove, 34 and a left inner elongated, concave groove, or simply a left inner groove, 36 that are adjacent to each other and meet at a left back end point 31 and a left front end point 33. As illustrated, the respective concavity (i.e., the vertical depth of the groove perpendicular to the horizontal plane) of the left outer groove 34 and the left inner groove 36 form a left elongated convex center section, or simply a left convex, 32 that is axially extending along the length of the left set of channels 30. Further, the left outer groove 34 has slightly more curvature than the left inner groove 36. As shown, the left horizontal curvature 19 "faces in" and curves toward the center of the board 10.

Similarly, the right set of channels 40 further comprises a right outer elongated, concave groove, or simply a right outer groove, 44 and a right inner elongated, concave groove, or simply a right inner groove, 46 that are adjacent to each other and meet at a right back end point 41 and a right front end point 43. As illustrated, the respective concavity of the right outer groove 44 and the right inner groove 46 forms a right elongated convex center section, or simply a right convex, 42 that is axially extending along the length of the right set of channels 40. The right outer groove 44 has slightly more curvature than the right inner groove 46. As shown, the right horizontal curvature 17 "faces in" and curves toward the center of the board 10.

It is to be appreciated that the left set of channels 30 and the right set of channels 40 may comprise any length, and may be laterally positioned anywhere alongside the left rail 18 and the right rail 16 (e.g, extending from the tail 14 to the nose 12, extending from the tail 14 to around the midpoint of the board 10, extending from several inches from the tail 14 to several inches from the nose 12, extending from the midpoint of the board 10 to the nose 12, etc.). As both the left horizontal curvature 19 and the right horizontal curvature 17 "face in" toward the center, the left set of channels 30 and the right set of channels 40 face or curve toward each other. Moreover, as can be seen in FIGS. 2-5, the left outer groove 34 is substantially identical to the right outer groove 44, and the left inner groove 36 is substantially identical to the right inner groove 46.

Figure 6:
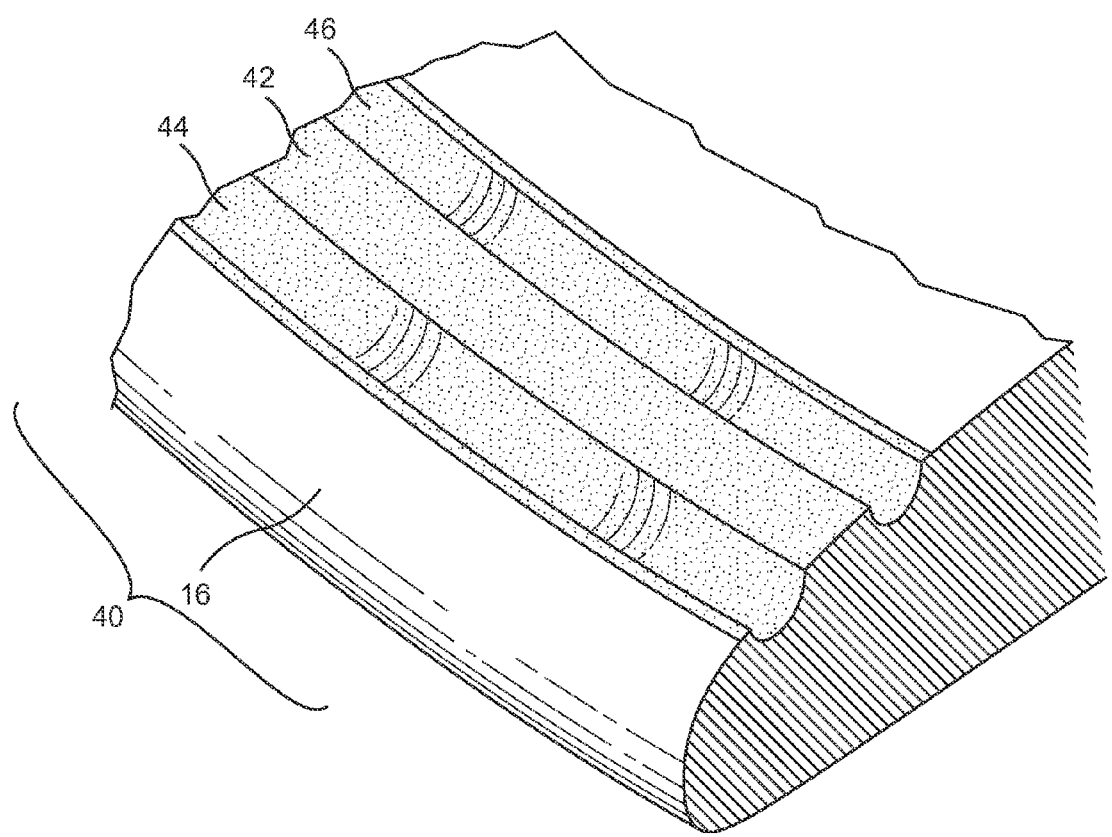
FIG. 6 is a perspective, close up view of a section of the channels.

FIG. 6 shows a perspective, close up view of a section of the set of channels 28, which according to this preferred embodiment comprises the left set of channels 30 and the right set of channels 40. For illustration purposes, FIG. 6 illustrates a section of the right rail 16 and the right set of channels 40. However, as the sets of channels 30 and 40 are identical in structure, is to be understood that FIG. 6 can also be interpreted as depicting a perspective view of a section of the left rail 18 and the left set of channels 30. Accordingly, the description of elements of the right set of channels 40 herein is applicable to the corresponding identical elements of the left set of channels 30.

According to a preferred embodiment, the depths of the right outer groove 44 and the right inner groove 46 (and the corresponding left outer groove 34 and left inner groove 36) may be identical and may include any suitable depth that does not compromise the structural integrity of the board 10. In one embodiment, the concavity/vertical depth of the grooves 44 and 46 (and the corresponding left outer groove 34 and left inner groove 36) may range from $3/8^{th}$ of an inch to $5/8^{th}$ of an inch at their respective midpoint. Moreover, the left set of channels 30 and the right set of channels 40 may comprise various left convex 32 and right convex 42 having different shapes, as shown in FIGS. 7A-7C below.

Figure 7A:
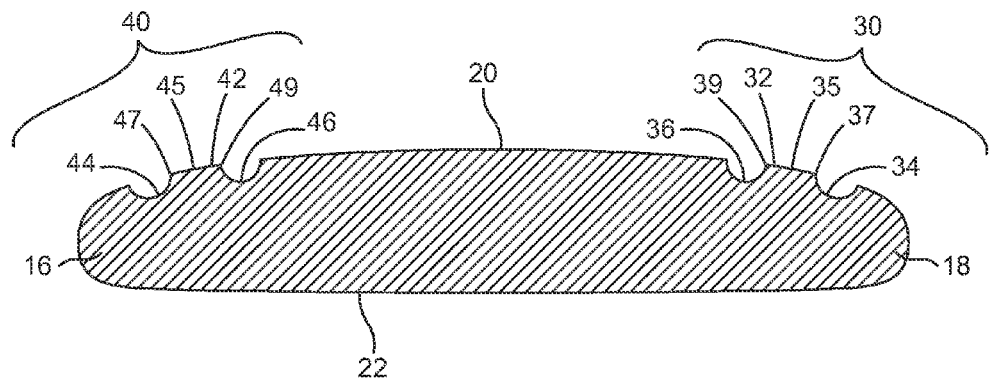
FIGS. 7A-7C are cross-sectional views of the preferred embodiment of the stringerless surfboard with the channels.

In FIG. 7A, a preferred embodiment of the left set of channels 30 and the right set of channels 40 is provided. As shown here, the left set of channels 30 comprises the left outer groove 34, the left inner groove 36 and the left convex 32, wherein the left convex 32 further comprises a flat top 35, a sharp angled inner edge 39 and a sharp angled outer edge 37. Similarly, the right set of channels 40 comprises the right outer groove 44, the right inner groove 46 and the right convex 42, wherein the right convex 42 further comprises a flat top 45, a sharp angled inner edge 49 and a sharp angled outer edge 47.

Figure 7B:
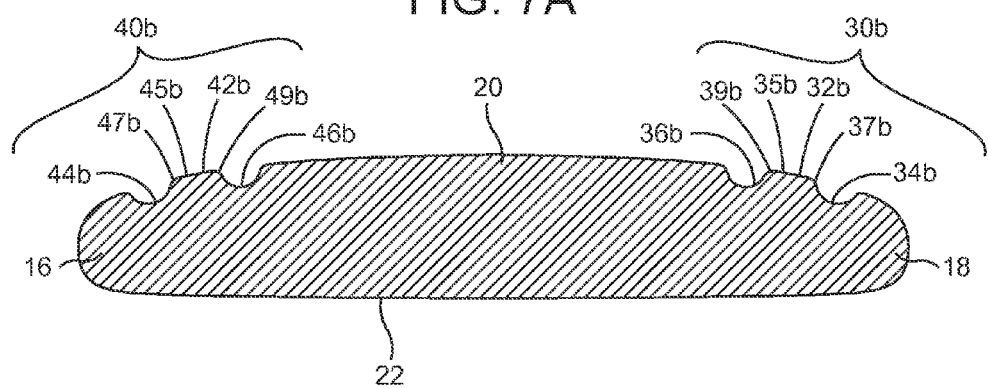
Figure 7C:
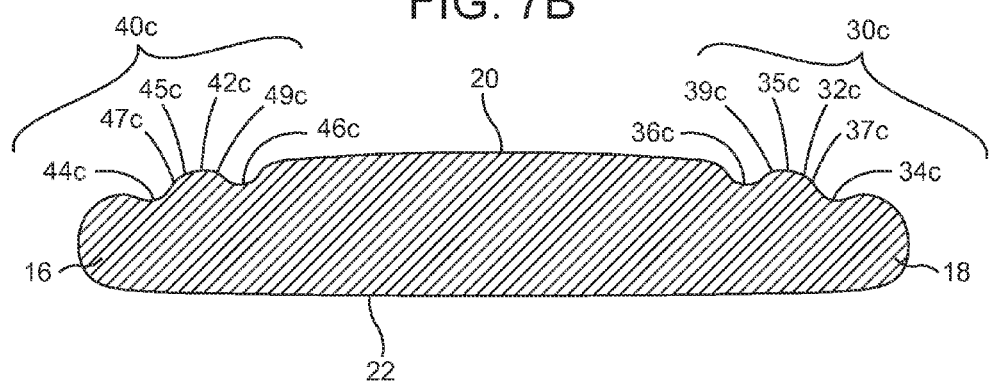

FIG. 7B illustrates a second preferred embodiment of a left set of channels 30b and a right set of channels 40b, where elements of similar structure are designated by the same reference numerals followed by the lower case "b."

In this second preferred embodiment, the left set of channels 30b comprises a left outer groove 34b, a left inner groove 36b and a left convex 32b, wherein the left convex 32b further comprises a flat top 35b, a semi-rounded inner edge 39b and a semi-rounded outer edge 37b. The right set of channels 40b comprises a right outer groove 44b, a right inner groove 46b and a right convex 42b, wherein the right convex 42b further comprises a flat top 45b, a semi-rounded inner edge 49b and a semi-rounded outer edge 47b.

FIG. 7C illustrates yet a third preferred embodiment of a left set of channels 30c and a right set of channels 40c, where elements of similar structure are designated by the same reference numerals followed by the lower case "c."

In this third preferred embodiment, the left set of channels 30c comprises a left outer groove 34c, a left inner groove 36c and a left convex 32c, wherein the left convex 32c further comprises a semi-rounded or rounded top 35c, a semi-rounded or rounded inner edge 39c and a semi-rounded or rounded outer edge 37c. The right set of channels 40c comprises a right outer groove 44c, a right inner groove 46c and a right convex 42c, wherein the right convex 42c further comprises a semi-rounded or rounded top 45c, a semi-rounded or rounded inner edge 49c and a semi-rounded or rounded outer edge 47c.

It shall be appreciated that the shapes of the left convex 32 and the right convex 42 may comprise any suitable shape and are not limited to only the disclosed embodiments described herein.

Figure 8A:
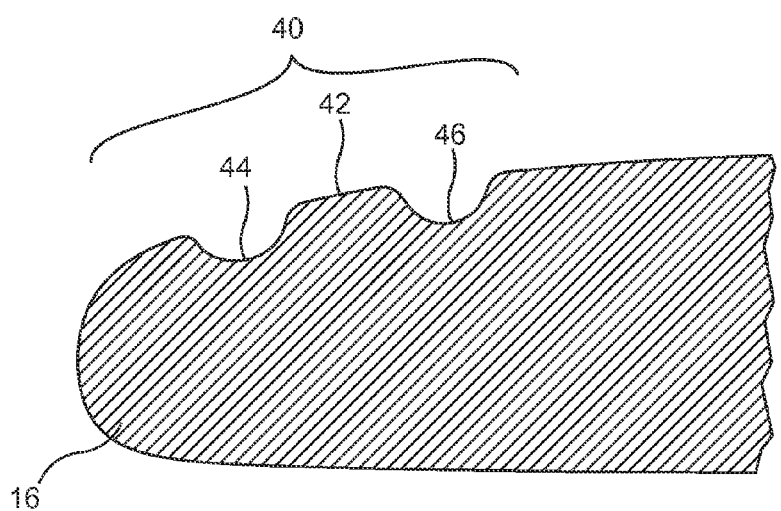
FIGS. 8A-8C are cross-sectional, close up views of the preferred embodiments of the channels.
Figure 8B:
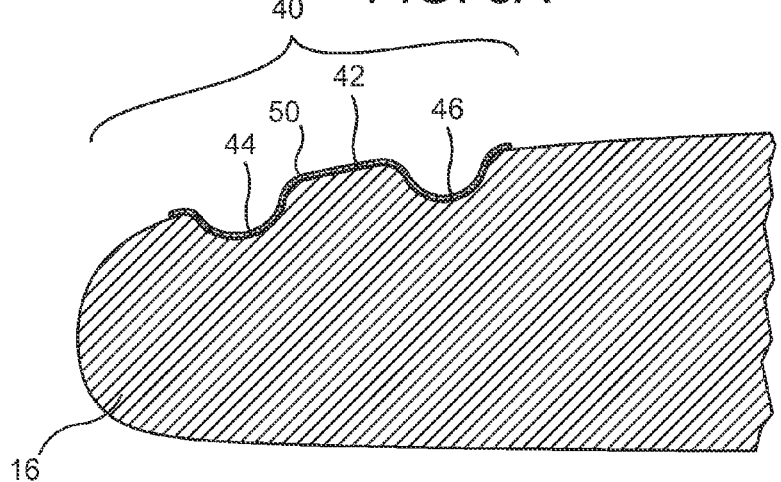
Figure 8C:
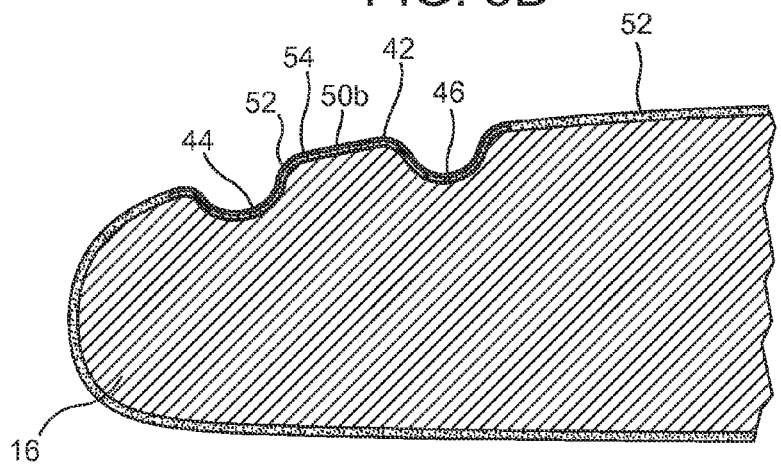

Further, to allow finer adjustments of the flex and rigidity of the board 10, some preferred embodiments of the board 10 may include a laminating layer 50 glassed over the set of channels 28, embodied here in the left set of channels 30 and the right set of channels 40. FIGS. 8A-8C show front cross-sectional views that represent the left set of channels 30 and the right set of channels 40. For illustration purposes, FIGS. 8A-8C illustrate front cross-sectional views of the right rail 16 and the right set of channels 40. However, as the set of channels 30 and 40 are identical in structure, is to be understood that FIGS. 8A-8C can also be interpreted as depicting back cross-sectional views of the left rail 18 and the left set of channels 30. Accordingly, the description of the elements of the right set of channels 40 herein is applicable to the corresponding identical elements of the left set of channels 30.

FIG. 8A illustrates an embodiment of the board 10 that does not include any laminating layer glassed over the set of channels 30 and 40. FIG. 8B illustrates another embodiment of the board 10b that includes a single laminating layer 50 glassed over the set of channels 40. By way of example, and not as a limitation, the single laminating layer 50 may include fiberglass cloth, Kevlar, carbon fiber or any suitable materials known in the industry.

FIG. 8C illustrates yet another embodiment of the board 10c that includes a plurality of laminating layers 50b, which may comprise any combination of fiberglass cloth 52, Kevlar 54, carbon fiber 56 or any suitable materials known in the industry.

According to a preferred embodiment, the laminating layer 50 or a plurality of laminating layers 50b may be inlayed and glassed onto the pair of set of channels 30 and 40 using any known methods in the field. For instance, hand lamination or vacuum bag lamination and either epoxy or polyester resin may be appropriate for this process.

It is to be appreciated that the different embodiments of the left set of channels 30 and the right set of channels 40 provide various degrees of flexibility and rigidity to the board 10. For instance, the board 10 that does not comprise the laminating layer 50 over the set of channels 30 and 40 may provide more flexibility and the least rigidity, whereas the board 10c that comprises a plurality of laminating layers 50b over the set of channels 30 and 40 may provide the least flexibility and the most rigidity.

FIGS. 9-13 illustrate another preferred embodiment of a stringerless surfboard with a set of channels 10d, where elements of similar structure are designated by the same reference numerals followed by the lower case "d."

Similar to the first embodiment, the board 10d may include a blank foam made of polyurethane foam, polystyrene foam, expanded polystyrene foam, or extruded polystyrene foam, which does not include a wooden stringer. As shown in FIGS. 9-12, the board 10d generally comprises a nose 12d, a tail 14d, a deck 20d, a bottom portion 22d, a right rail 16d, a left rail 18d, and at least a set of channels placed on the deck 20d. According to this preferred embodiment, the set of channels further comprises a pair of identical sets of channels laterally positioned along the rails 16d and 18d, namely, a left set of channels 30d and a right set of channels 40d, and a center set of channels 60 axially extending along the center of the board 10d extending from the tail 14d to around a midpoint or slightly over the midpoint of the board 10d. The center set of channels 60 is not shown in the first embodiment. The left set of channels 30d is axially extending and conforming to a left horizontal curvature 19d of the left rail 18d, and the right set of channels 40d is axially extending and conforming to a right horizontal curvature 17d of the right rail 16d. Preferably, the sets of channels 30d, 40d and 60 may be shaped into the deck 20d.

The left set of channels 30d further comprises a left outer elongated, concave groove, or simply a left outer groove, 34d and a left inner elongated, concave groove, or simply a left inner groove, 36d that are adjacent to each other and meet at a left back end point 31d and a left front end point 33d. As illustrated, the respective concavity of the left outer groove 34d and the left inner groove 36d forms a left elongated convex center section, or simply a left convex, 32d that is axially extending along the length of the left set of channels 30d. As shown, the left outer groove 34d has slightly more curvature than the left inner groove 36d and the left horizontal curvature 19d "faces in" and curves toward the center of the board 10d.

The right set of channels 40d further comprises a right outer elongated, concave groove, or simply a right outer groove, 44d and a right inner elongated, concave groove, or simply a right inner groove, 46d that are adjacent to each other and meet at a right back end point 41d and a right front end point 43d. As illustrated, the respective concavity of the right outer groove 44d and the right inner groove 46d form a right elongated convex center section, or simply a right convex, 42d that axially runs along the length of the right set of channels 40d. Moreover, the right outer groove 44d has slightly more curvature than the right inner groove 46d. As shown, the right horizontal curvature 17d "faces in" and curves toward the center of the board 10d.

Figure 9:
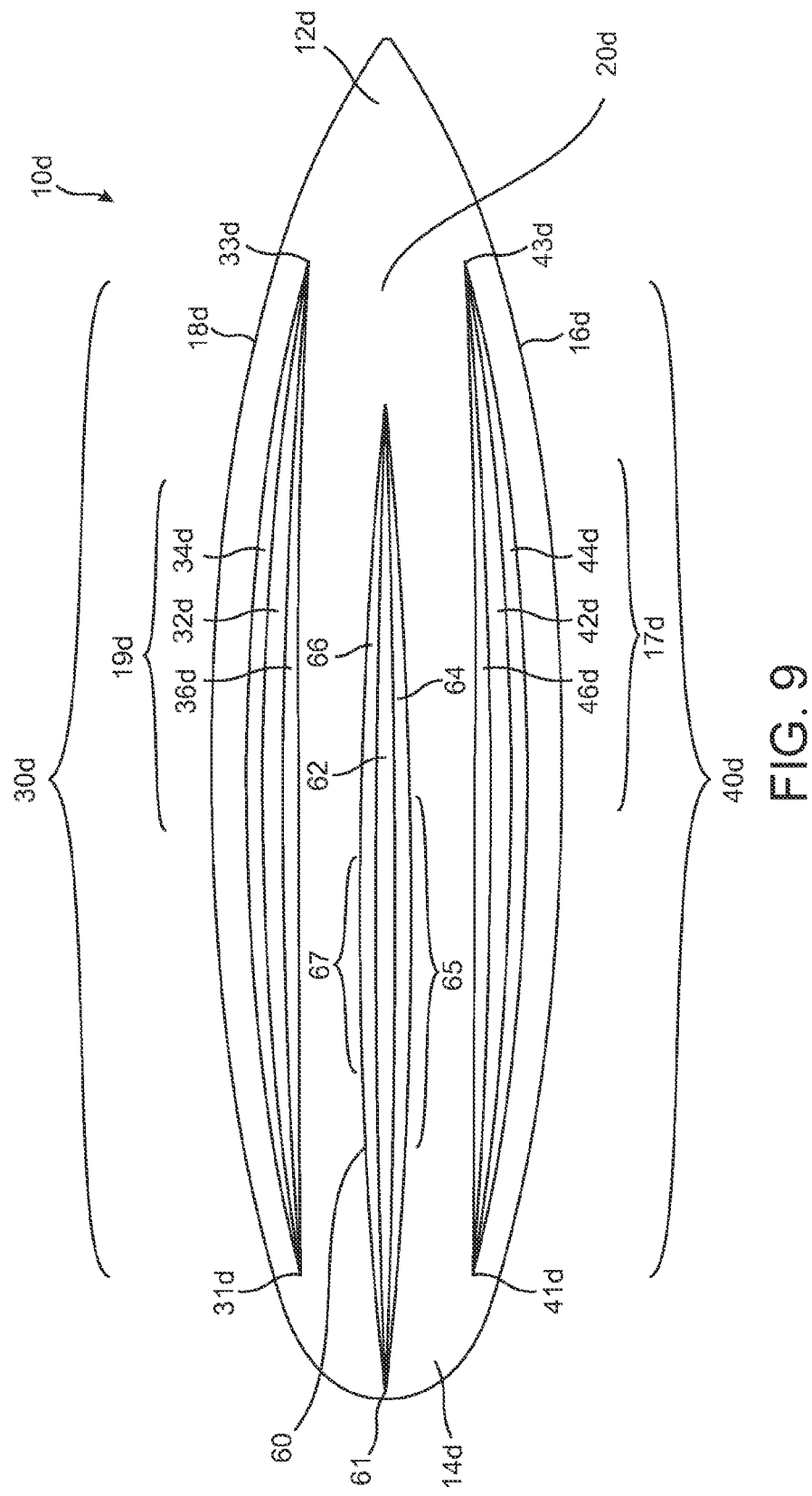
FIG. 9 is a top view of an alternative embodiment of a stringerless surfboard with channels.
Figure 10:
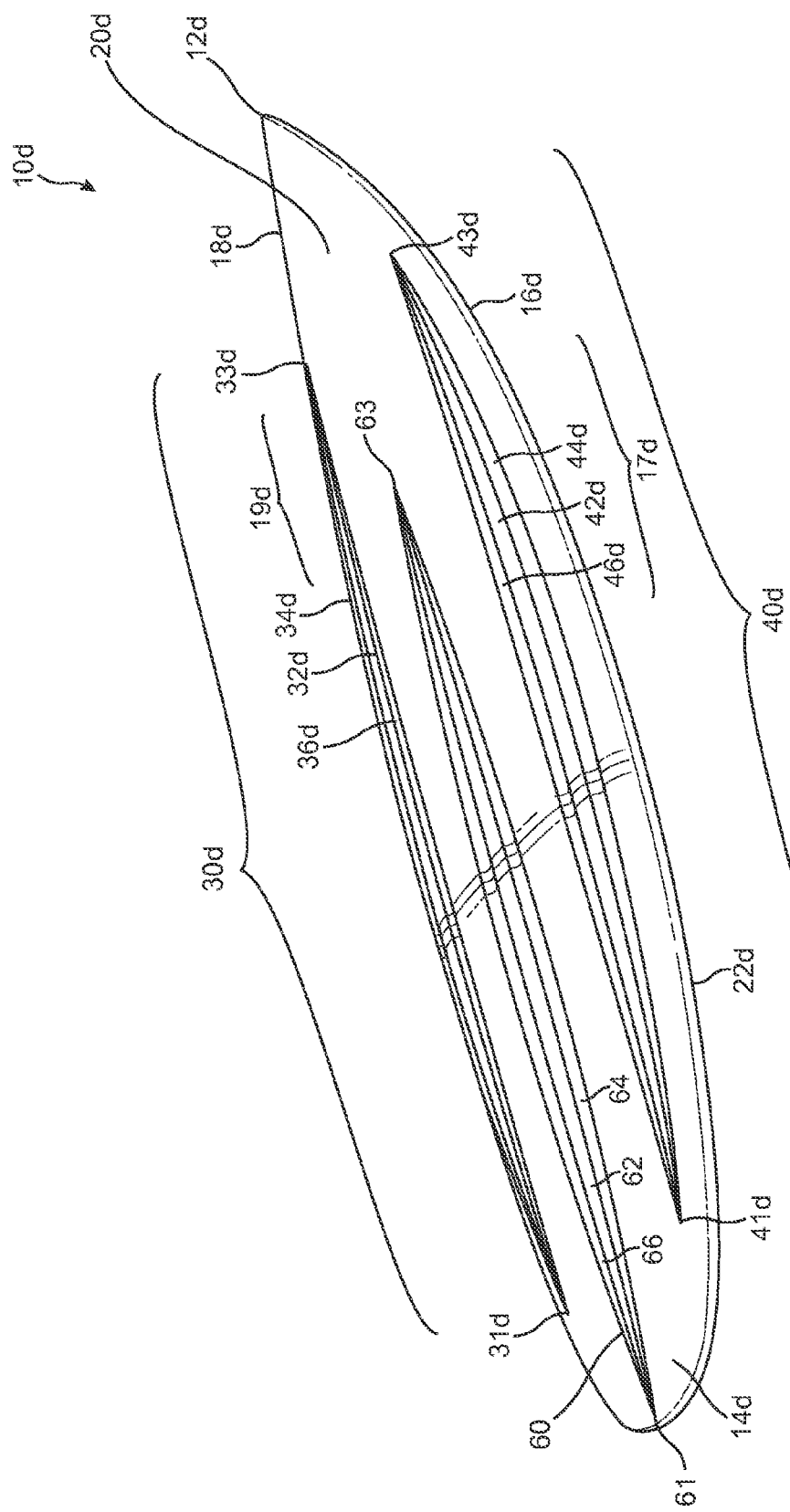
FIG. 10 is a perspective view of the alternative embodiment of the stringerless surfboard with the channels.
Figure 11:
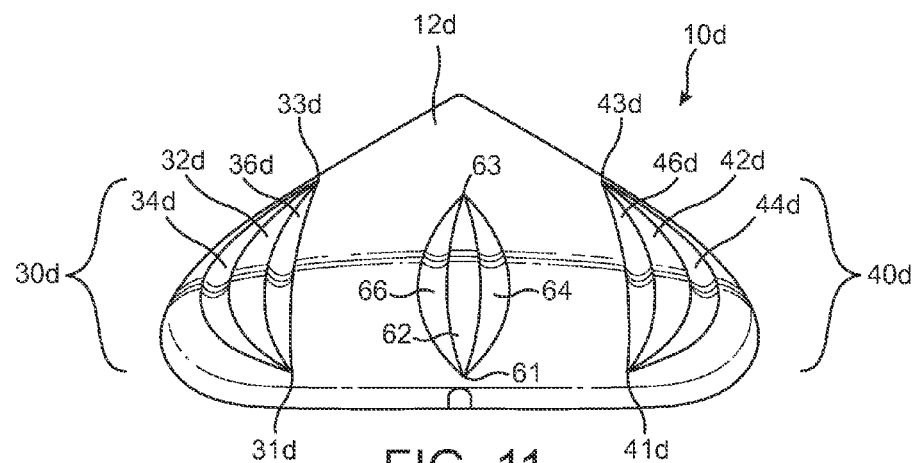
FIG. 11 is a back view of the alternative embodiment of the stringerless surfboard with the channels.
Figure 12:
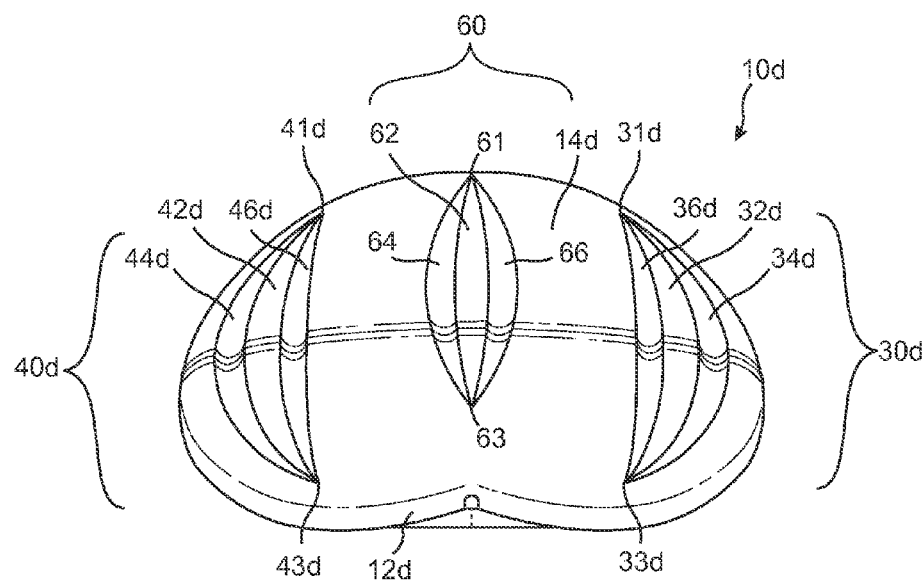
FIG. 12 is a front view of the alternative embodiment of the stringerless surfboard with the channels.
Figure 13:
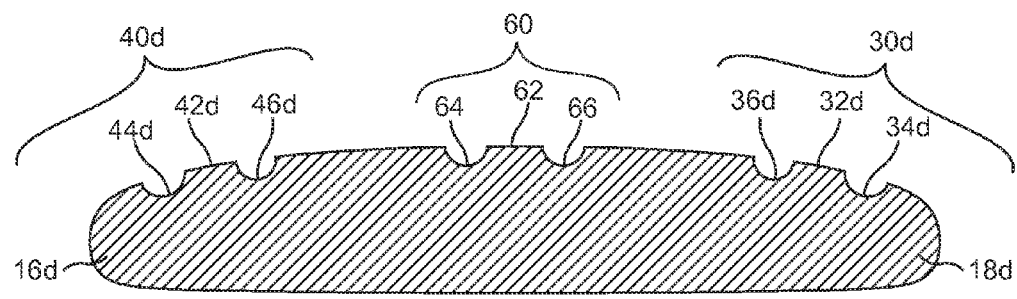
FIG. 13 is a cross-sectional view of the alternative embodiment of the stringerless surfboard with the channels.

Similar to the left set of channels 30d and the right set of channels 40d, the center set of channels 60 further comprises a center right elongated, concave groove, or simply a center right groove, 64 and a center left elongated, concave groove, or simply a center left groove, 66 that are adjacent to each other and meet at a center back end point 61 and a center front end point 63. As illustrated in FIG. 9, the center right groove 64 has a horizontal curvature 65 that "faces in" and curves toward the center of the board 10d Similarly, the left center groove 66 has a horizontal curvature 67 that "faces in" toward the center of the board 10d. Consequently, the center right groove 64 and the center left groove 66 face or curve toward each other. The respective concavity of the center right groove 64 and the center left groove 66 forms a center elongated convex center section, or simply a center convex, 62 that is axially extending along the length of the center set of channels 60.

It is to be appreciated that the left set of channels 30d, the right set of channels 40d and the center set of channels 60 may comprise any length, and may be positioned anywhere on the deck 20 (e.g., laterally alongside the left rail 18, the right rail 16 and centrally along the center of the board; extending from the tail 14d to the nose 12d, extending from the tail 14d to around the midpoint of the board 10d, extending from several inches from the tail 14d to several inches from the nose 1d2, extending from the midpoint of the board 10d to the nose 12d, etc.).

In this alternative embodiment, the depths of the grooves 34d, 36d, 44d, 46d, 64 and 66 may be substantially similar to the depths of the grooves 34, 36, 44 and 46 of the board 10 in the first embodiment discussed above. Moreover, the left set of channels 30d, the right set of channels 40d and the center set of channels 60 may comprise various left convex 32d, right convex 42d and center convex 62 having different shapes similar to the left set of channels 30 and the right set of channels 40 of the board 10 in the first embodiment discussed and shown in FIGS. 7A-7C above. Lastly, to allow finer adjustments of the flex and rigidity of the board 10d, embodiments of the board 10d may include a laminating layer 50d glassed over the set of channels 30d, 40d and 60, similar to the board 10 in the first embodiments as discussed and shown in FIGS. 8A-8C above.

Figure 14:
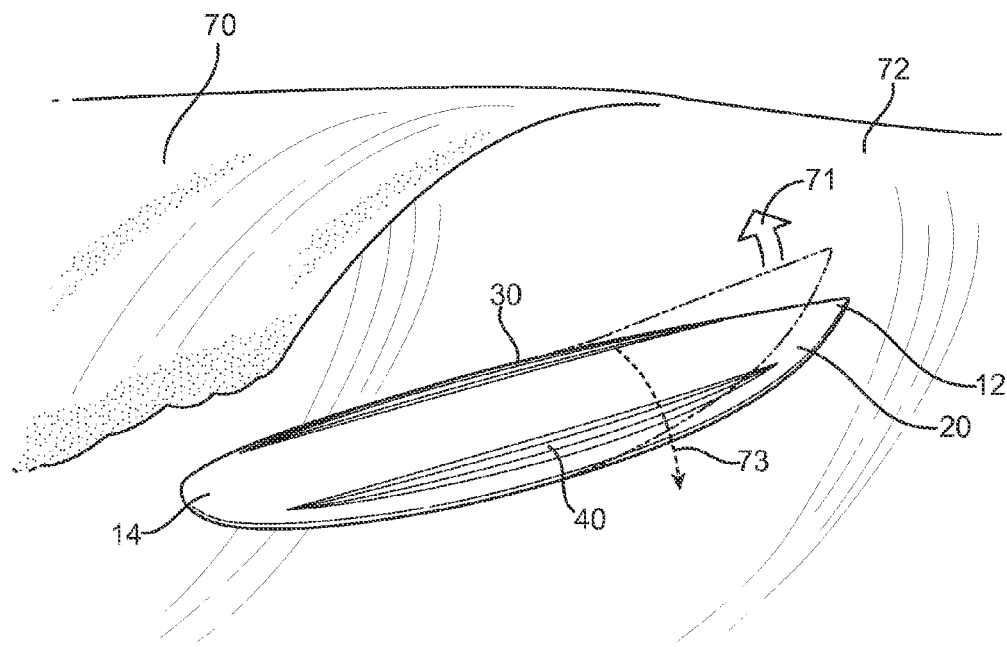
FIG. 14 is a perspective view of a preferred principle of operation of the stringerless surfboard with the channels.
Figure 15:
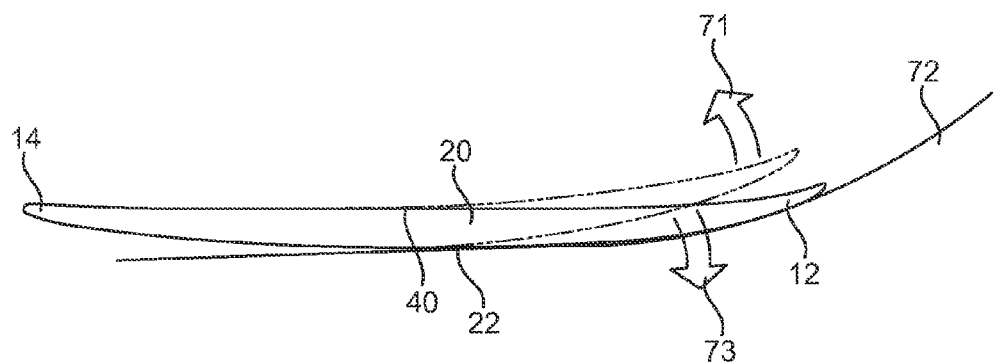
FIG. 15 is a side view of the preferred principle of operation of the stringerless surfboard with the channels.

Having described the various components of the embodiments of the board 10 in greater details, the preferred principles of operation of the board 10 can be further understood by referring to the following description and FIGS. 14 and 15.

FIG. 14 illustrates a front, perspective view of the board 10 as it is traveling on a wave 70, wherein the wave comprises an open face 72. FIG. 15 illustrates the side view of the board 10 as it is traveling on the wave 70. It is to be understood that in these figures, a surfer (not illustrated) is assumed to be riding down the face of the wave 72 in high speed and is in the process of turning into the face 72 to perform a maneuver. As the surfer and the board 10 travel in high speed and turn into the face 72, a portion of the board 10 begins to bend into the turn in the direction 71 and stores potential energy. As the board 10 continues to bend, the compressive stress on the deck 20 and the tensile stress on the bottom 22 begin to approach their respective maximum values. If the board 10 reaches its maximum compressive and tensile stress values, the foam of the board 10 will fail and the board 10 will break. To prevent the board 10 from reaching its maximum compressive and tensile stresses, the convex 32 of the left set of channels 30 and the convex 42 of the right set of channels 40 provide the rigidity and flexural strength necessary to prevent the board 10 from bending all the way in the direction 71.

However, because there is no stringer in the board 10, the sets of channels 30 and 40 still provide a flex pattern that is uniform. As the surfer comes out of the turn and straightens the board 10, the board 10 springs back to its original shape in the direction 73, releases the potential energy to become kinetic energy and propels the surfer out of the turn. This burst of kinetic energy can be turned into an acceleration to help the surfer gain speed for the next maneuver.

Figure 16:
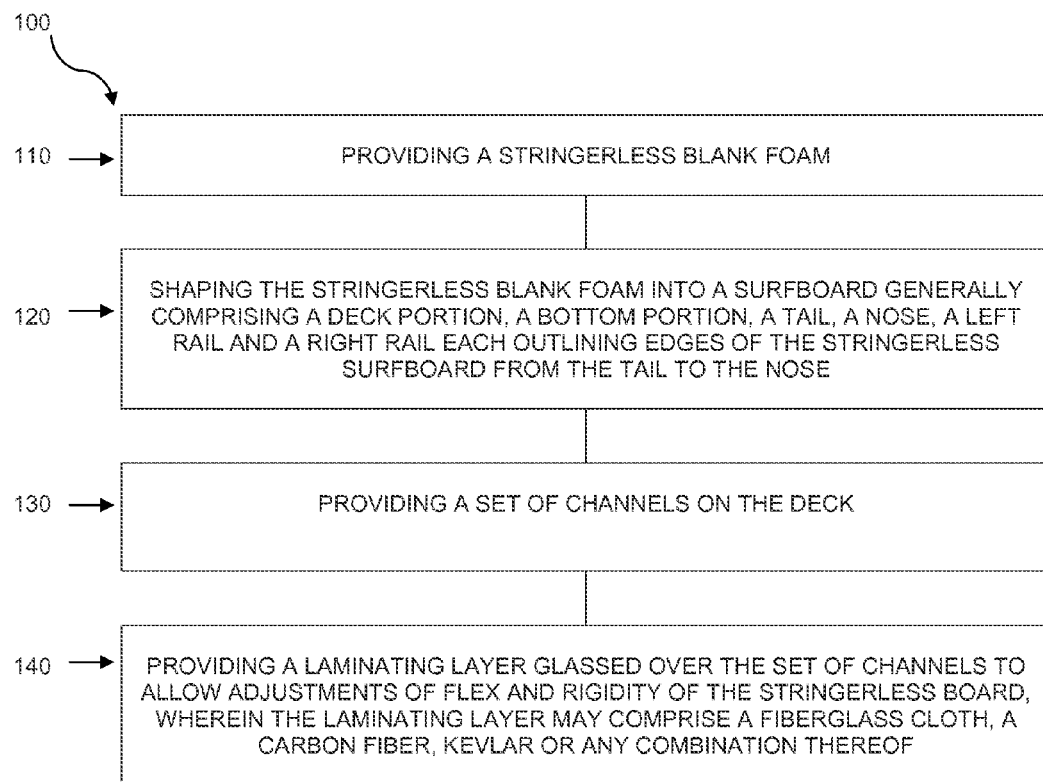
FIG. 16 is a diagram of a preferred method of providing a stringerless surfboard with channels.

FIG. 16 illustrates a preferred method 100 of providing a stringerless surfboard with a set of channels. The method 100 may comprise a step 110 of providing a stringerless blank foam, a step 120 of shaping the stringerless blank foam into a surfboard generally comprising a deck portion, a bottom portion, a tail, a nose, a left rail and a right rail each outlining edges of the stringerless surfboard from the tail to the nose, and a step 130 of providing at least a set of channels on the deck of the stringerless board. In one preferred method, the method 100 may further comprise a step 140 of providing a laminating layer glassed over the set of channels to allow adjustments of flex and rigidity of the stringerless board, wherein the laminating layer may comprise a fiberglass cloth, a carbon fiber, Kevlar or any combination thereof.

The step 110 of providing a stringerless blank foam may further comprise selecting a blank foam made of polyurethane foam, polystyrene foam, expanded polystyrene foam, or extruded polystyrene foam, which does not include a wooden stringer.

The step 120 of shaping the stringerless blank foam into a surfboard generally comprising a deck portion, a bottom portion, a tail, a nose, a left rail and a right rail outlining edges of the stringerless surfboard from the tail to the nose may be performed using known methods and techniques in the art.

In one preferred method, the step 130 of providing at least a set of channels on the deck may further comprise providing a pair of adjacent, axially extending elongated concave grooves that meet at their endpoints to form an elongated convex center. In yet another preferred method, the step 130 may further comprise providing a left set of channels laterally positioned on the deck adjacent to the left rail and a right set of channels laterally positioned on the deck adjacent to the right rail. In the preferred method, the left set of channels and the right set of channels may face in toward the center of the board and curve toward each other.

According to an alternative method, the step 130 of providing a set of channels on the deck may further comprise providing a left set of channels laterally positioned on the deck adjacent to the left rail, a right set of channels laterally positioned on the deck adjacent to the right rail, and a center set of channels centrally positioned on the deck and axially extending in the middle of the stringerless surfboard.

Preferably, the step 130 is performed by shaping the set of channels into the deck. According to a preferred method, the step 130 may be performed by shaping identical depths for each pair of adjacent elongated concave grooves and may include shaping any suitable depth that does not compromise the structural integrity of the board. In one method, the depth of the concave grooves may range from $\frac{3}{8}^{th}$ of an inch to $\frac{5}{8}^{th}$ of an inch at their respective midpoint. Moreover, the step 130 may preferably include shaping the elongated convex center having a flat top, a semi-rounded top or a rounded top with sharp-angled edges, semi-rounded edges or rounded edges.

According to a preferred method, the step 140 may comprise glassing the laminating layer onto the set of channels using any known methods in the field, including hand lamination or vacuum bag lamination using either epoxy or polyester resin. Further, the step 140 may preferably comprise providing a laminating layer glassed over a left set of channels and a right set of channels to allow adjustments of flex and rigidity of the stringerless board, wherein the laminating layer may comprise a fiberglass cloth, a carbon fiber, Kevlar or any combination thereof. In an alternative embodiment, the step 140 may further comprise providing a laminating layer glassed over a left set of channels, a right set of channels and a center set of channels to allow adjustments of flex and rigidity of the stringerless board, wherein the laminating layer may comprise a fiberglass cloth, a carbon fiber, Kevlar or any combination thereof.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A stringerless surfboard configured to provide a uniform flex pattern, rigidity and reduced overall weight comprising:
 a stringerless foam;
 a generally planar deck portion,
 a generally planar bottom portion,
 a nose a tail;
a left rail and a right rail each outlining edges of the stringerless surfboard from the tail to the nose; and
a set of channels formed on the deck further comprising a pair of adjacent, axially extending elongated concave grooves that meet at their endpoints to form a rigid elongated convex center,
wherein the set of channels comprises a left set of channels laterally positioned on the deck along the length of the left rail and conforming to a curvature of the left rail, and a right set of channels laterally positioned on the deck along the length of the right rail and conforming to a curvature of the right rail,
wherein the left set of channels and the right set of channels face and curve in toward each other.

2. The stringerless surfboard of claim 1, wherein the elongated convex center in the set of channels further comprises a semi-rounded or rounded top.

3. The stringerless surfboard of claim 1, wherein the pair of adjacent elongated concave grooves of the set of channels may comprise a depth having a range of $3/8^{th}$ of an inch to $5/8^{th}$ of an inch.

4. The stringerless surfboard of claim 1, further comprising:
a laminating layer glassed over the set of channels to allow adjustments of flex and rigidity of the stringerless board, wherein the laminating layer may comprise a fiberglass cloth, a carbon fiber, high-modulus polyethylene (HMPE) or any combination thereof.

5. The stringerless surfboard of claim 1, further comprising:
a center set of channels positioned on the deck and axially extending in the middle of the stringerless surfboard.

6. The stringerless surfboard of claim 1, wherein
the left set of channels further comprises a left outer groove and a left inner groove, wherein the left outer groove is slightly more horizontally curved than the left inner groove; and
the right set of channels further comprises a right outer groove and a right inner groove wherein the right outer groove is slightly more horizontally curved than the right inner groove.

7. A stringerless surfboard configured to provide a uniform flex pattern, rigidity and reduced overall weight comprising:
a stringerless foam;
a deck portion;
a bottom portion;
a nose;
a tail;
a left rail and a right rail each outlining edges of the stringerless surfboard from the tail to the nose;
a left set of axially extending channels formed on the deck and laterally positioned adjacent to the left rail; and
a right set of axially extending channels formed on the deck and laterally positioned adjacent to the right rail,
wherein each of the left set of channels and the right set of channels further comprises a pair of adjacent, axially extending elongated concave grooves that meet at their endpoints to form an elongated convex center.

8. The stringerless surfboard of claim 7, further comprising:
a laminating layer glassed over the left set of channels and the right set of channels to allow adjustments of flex and rigidity of the stringerless board, wherein the laminating layer may comprise a fiberglass cloth, a carbon fiber, high-modulus polyethylene (HMPE) or any combination thereof.

9. The stringerless surfboard of claim 7, wherein
the left set of channels further comprises a left outer groove and a left inner groove, wherein the left outer groove is slightly more horizontally curved than the left inner groove; and
the right set of channels further comprises a right outer groove and a right inner groove wherein the right outer groove is slightly more horizontally curved than the right inner groove.

10. The stringerless surfboard of claim 7, wherein the elongated convex center in each of the left set of channels and the right set of channels further comprises a semi-rounded or rounded top.

11. The stringerless surfboard of claim 7, wherein the pair of adjacent, axially extending elongated concave grooves of each of the left set of channels and the right set of channels may comprise a depth having a range of $3/8^{th}$ of an inch to $5/8^{th}$ of an inch.

12. A method for providing a stringerless surfboard configured to provide a uniform flex pattern, rigidity and reduced overall weight comprising:
providing a stringerless blank foam;
shaping the stringerless blank foam into a surfboard generally comprising a deck portion, a bottom portion, a tail, a nose, a left rail and a right rail each outlining edges of the stringerless surfboard from the tail to the nose; and
providing at least a set of axially extending channels on the deck,
wherein the set of axially extending channels comprises a left set of channels laterally positioned on the deck along the length of the left rail and conforming to a curvature of the left rail, and a right set of channels laterally positioned on the deck along the length of the right rail and conforming to a curvature of the right rail,
wherein the left set of channels and the right set of channels face and curve in toward each other.

13. The method for providing a stringerless surfboard configured to provide a uniform flex pattern, rigidity and reduced overall weight of claim 12, wherein the step of providing at least a set of axially extending channels on the deck further comprises providing a pair of adjacent, elongated concave grooves that meet at their endpoints to form an elongated convex center.

14. The method for providing a stringerless surfboard configured to provide a uniform flex pattern, rigidity and reduced overall weight of claim 12, further comprising providing a laminating layer glassed over the set of channels to allow adjustments of flex and rigidity of the stringerless board, wherein the laminating layer may comprise a fiberglass cloth, a carbon fiber, high-modulus polyethylene (HMPE) or any combination thereof.

15. The method for providing a stringerless surfboard configured to provide a uniform flex pattern, rigidity and reduced overall weight of claim 12, wherein the step of providing at least a set of channels on the deck further comprises:
providing a left set of channels laterally positioned on the deck adjacent the left rail and a right set of channels laterally positioned on the deck adjacent to the right rail.

16. The method for providing a stringerless surfboard configured to provide a uniform flex pattern, rigidity and reduced overall weight of claim 12, wherein the step of providing at least a set of channels on the deck further comprises provide a left set of channels laterally positioned on the deck adjacent to the left rail, a right set of channels laterally positioned on the deck adjacent to the right rail, and a center set of channels centrally positioned on the deck and axially extending in the middle of the stringerless surfboard.

17. The method for providing a stringerless surfboard configured to provide a uniform flex pattern, rigidity and reduced overall weight of claim 13, wherein the step of providing at least a set of channels on the deck further comprises providing a left set of channels further comprising a left outer groove and a left inner groove, wherein the left outer groove is slightly more horizontally curved than the left inner groove; and providing a right set of channels further comprising a right outer groove and a right inner groove wherein the right outer groove is slightly more horizontally curved than the right inner groove.

18. The method for providing a stringerless surfboard configured to provide a uniform flex pattern, rigidity and reduced overall weight of claim 13, wherein the step of providing at least a set of channels on the deck further comprises shaping the elongated convex center to comprise a semi-rounded or rounded top.

19. The method for providing a stringerless surfboard configured to provide a uniform flex pattern, rigidity and reduced overall weight of claim 13, wherein the step of providing at least a set of channels on the deck further comprises shaping the adjacent elongated concave grooves to comprise a depth having a range of $3/8^{th}$ of an inch to $5/8^{th}$ of an inch.

* * * * *